April 12, 1927.

H. L. HEATHCOTE 1,624,597

METHOD OF MANUFACTURING BALL ROLLING DISKS

Filed Feb. 6, 1922

INVENTOR
H.L. HEATHCOTE
ATTORNEYS

Patented Apr. 12, 1927.

1,624,597

UNITED STATES PATENT OFFICE.

HENRY LEONARD HEATHCOTE, OF COVENTRY, ENGLAND, ASSIGNOR TO RUDGE-WHITWORTH LIMITED, OF COVENTRY, ENGLAND.

METHOD OF MANUFACTURING BALL ROLLING DISKS.

Application filed February 6, 1922, Serial No. 534,502, and in Great Britain March 2, 1921.

This invention relates to the manufacture of balls for bearings and particularly to the production and/or restoration of appliances by means of which roughly formed ball blanks are brought to a desired state of finish.

In such manufacture rough spherical blanks are formed by any convenient means, such as hot or cold forging or turning from the bar and a comparatively inexpensive and quick method of bringing these blanks to a smooth and approximately spherical condition is by rolling between two hardened steel disks provided with concentric and complementary grooves preferably of approximately semi-circular section, which grooves have their surface traversed by a succession of edges produced by cutting or forming small adjacent furrows or channels transversely from one edge to the other of the groove, either at right angles or inclined to the edges or sides.

The manufacture of suitable disks having grooves therein which are channelled upon their surfaces has been found to present considerable difficulties, as warping is very likely to occur as the result of the hardening process to which the discs must be subjected. The channeling of the surface of the grooves is also found to deteriorate very rapidly in use and first along those parts of the grooves which stand higher (axially) than other parts.

The object of the present invention is to overcome the foregoing difficulties and to provide improvements in the production and/or rectification of disks or other appliances for rolling or otherwise finishing the aforesaid rough blanks for bearing balls.

The invention consists in a method of preparing hardened disks or like appliances provided with one or more grooves having channeled surfaces for rolling or otherwise finishing rough blanks for bearing balls or the like, according to which an etching process is employed for wholly or in part forming the channels in the already hardened surfaces of the grooves.

The invention further consists in bringing the disks to their hardened state either before or after the concentric grooves are formed thereon, then if necessary truing the grooves by running the disks with balls in the grooves, by grinding or otherwise and finally etching the channels in the grooves.

Referring now to the accompanying more or less diagrammatic drawings:—

Figure 1:
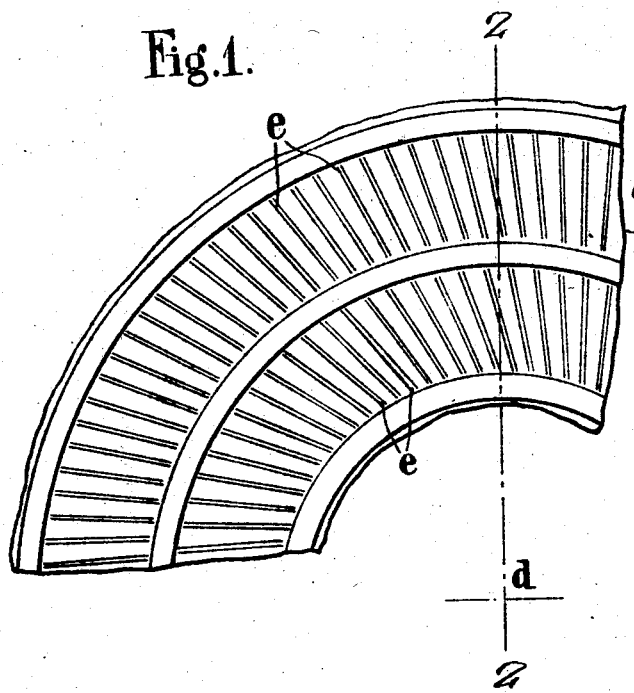
Figure 2:
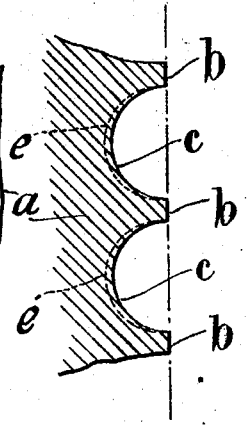

Fig. 1 is a plan of a portion of a disk or like appliance in accordance with this invention, and Fig. 2 is a section on the line 2—2 of Fig. 1.

In the accompanying drawings, which show by way of example a portion of a disk in accordance with the invention, $a$ is a disk of steel of suitable character having a flat surface $b$ in which are formed any desired number of annular grooves $c$.

The grooves $c$ are concentric with one another and with the centre $d$ of the disk $a$, and the cross-section of these grooves $c$ is preferably semicircular, as shown in Figure 2.

The disk $a$ has a fellow disk (not shown in the drawing) which also has a flat surface with complementary grooves similar to the grooves $c$ formed therein.

The two disks are subjected to suitable hardening processes, and in the event of any warping or like distortion resulting therefrom the grooves are rectified by running the disks with balls in the grooves, by grinding or by any other convenient method, the two disks being so treated that when applied to one another they provide annular grooves of a suitable cross-section for rolling the bearing balls which it is desired to produce.

When completed the disks are covered with acid-resisting material and lines, as shown at $e$ Fig. 1, are scratched through the acid resist from one side to the other of the grooves and at a slight inclination to radial lines which would pass through the center of the concentric grooves. The disks are then immersed in, or the grooves filled with, an etching solution which may conveniently have the following properties:— Cupric chloride, 10 grams; water, 60 cubic centimeters; nitric acid, 1.4 specific gravity, 30 cubic centimeters.

After a suitable treatment the etching solution may be removed to see what progress has been made and so long as this is insufficient for the purpose the disk is again re-covered with eaching solution. Generally speaking, the grooves would be filled about five or six times and then inspected with a view to ascertaining the progress, but any suitable modification may be effected in this respect in accordance with the existing conditions.

The etching process results in the formation of edged furrows or channels across the surface of the grooves c along the lines e e. When these channels are of the necessary depth the disks are made ready for use by neutralizing the etching solution and removing the acid resist, are filled with rough spherical blanks and one disk rotated relative to the other or both rotated in opposite directions in order to effect the finishing of the bearing balls.

In some cases it may be found convenient to harden the disks prior to the formation of the grooves therein and then to grind or lap grooves in them and finally etch the channels in the grooves.

The above description refers to the making of new disks or the like but the etching process for producing the necessary channels in the surface of the grooves may be employed with equal advantage for renewing or reproducing channels in grooves which have become worn as the result of continued use, the grooves being if necessary first rectified to the desired shape by any convenient means and the channels being formed by coating the disks with acid-resist material, scratching and subjecting them to the etching process as already described.

Although described with reference to the making of channels in grooves for the manufacture of bearing balls, it is to be understood that the invention is not restricted to this purpose and that it may be employed for the production of suitable sharp edged channels or furrows in any grooved or other surfaces which may be used for the manufacture or finishing of articles by a process as indicated.

Claims:

1. A method of preparing hardened disks or like appliances for finishing rough blanks for bearing balls or the like, comprising forming one or more concentric grooves in said disks, subjecting said disks to a hardening process and then to any necessary truing or rectifying of the said grooves as by running with balls in position, grinding or the like, and finally forming sharp-edged channels across the surface of the groove or grooves by etching.

2. A method of preparing disks with channeled surfaced grooves for treating bearing balls or the like, comprising shaping and grooving said disks, suitably hardening the necessary surfaces thereof, rectifying any irregularities in the hardened surfaces of the grooves, and then etching channels with sharp edges in the said surfaces.

3. A method of preparing disks with channeled surfaced grooves for treating bearing balls or the like, comprising shaping and grooving said disks, suitably hardening the necessary surfaces thereof, running said disks with balls or the like in position therein, so that any irregularities in the hardened surfaces of the grooves are rectified, and then employing an etching operation to form channels across the surfaces of the grooves for the purpose of providing cutting edges therein.

4. A method of preparing disks with channeled surfaced grooves for treating bearing balls or the like, comprising shaping and grooving said disks, suitably hardening the necessary surfaces thereof, rectifying any irregularities in the hardened surfaces of the grooves, employing an acid resist in such a manner as to protect certain areas of said surfaces, and then applying an acid solution to said grooves to etch channels in the unprotected parts without removal of the protected areas.

5. A method of preparing disks with channeled surfaced grooves for treating bearing balls or the like, comprising shaping and grooving said disks, suitably hardening the necessary surfaces thereof, rectifying any irregularities in the hardened surfaces of the grooves, employing an acid resist in such a manner as to protect certain areas of said surfaces and then applying a solution comprising: Cupric chloride, 10 grams; water, 60 cubic centimeters; nitric acid, 1.4 specific gravity, 30 cubic centimeters to said grooves to etch channels in the unprotected parts.

6. A method of producing ball-making disks with true-hardened groove surfaces and channels crossing the grooves, comprising hardening the grooved surface, truing the grooves, protecting strips of the trued surface against removal, and etching away channels between to leave the strips with edges suitable for performing a cutting operation.

7. A method of producing ball-making disks with true-hardened groove surfaces and channels crossing the grooves, comprising hardening the grooves, truing the grooves after hardening, applying an acid resist to the trued surface, removing transverse areas of the resist, and etching away the uncovered metal without disturbing the covered parts to form channels with intervening strips of trued surface having cutting edges.

In testimony whereof I have signed my name to this specification.

HENRY LEONARD HEATHCOTE